(12) United States Patent
Fielding et al.

(10) Patent No.: US 7,321,572 B2
(45) Date of Patent: *Jan. 22, 2008

(54) FRAME RELAY PROTOCOL-BASED MULTIPLEX SWITCHING SCHEME FOR SATELLITE MESH NETWORK

(75) Inventors: Dennis E. Fielding, Melbourne, FL (US); Todd W. Gross, Palm Bay, FL (US)

(73) Assignee: Gilat Satellite Networks, Ltd., Kiryat Arye (IL)

( * ) Notice: Subject to any disclaimer, the term of this patent is extended or adjusted under 35 U.S.C. 154(b) by 172 days.

This patent is subject to a terminal disclaimer.

(21) Appl. No.: 10/881,479

(22) Filed: Jun. 30, 2004

(65) Prior Publication Data

US 2004/0240406 A1 Dec. 2, 2004

Related U.S. Application Data

(63) Continuation of application No. 10/437,536, filed on May 14, 2003, now Pat. No. 6,771,617, which is a continuation of application No. 10/071,307, filed on Feb. 8, 2002, now Pat. No. 6,625,130, which is a continuation of application No. 08/786,234, filed on Jan. 21, 1997, now Pat. No. 6,381,227, which is a continuation of application No. 08/499,766, filed on Jul. 7, 1995, now abandoned, which is a continuation of application No. 08/079,250, filed on Jun. 17, 1993, now Pat. No. 5,434,850.

(51) Int. Cl.
H04B 7/155 (2006.01)

(52) U.S. Cl. ........................................ 370/321; 370/349

(58) Field of Classification Search ................ 370/321, 370/349
See application file for complete search history.

(56) References Cited

U.S. PATENT DOCUMENTS 3,634,628 A 1/1972 Sekimoto et al.

(Continued)

FOREIGN PATENT DOCUMENTS

EP 0 324 363 1/1989

(Continued)

OTHER PUBLICATIONS

IBM Technical Disclosure Bulletin, 'Interactive Computer Conference Server', Dec. 1991, vol. 34, Issue 7A, pp. 375-377.*

(Continued)

Primary Examiner—Melvin Marcelo
(74) Attorney, Agent, or Firm—Banner & Witcoff, Ltd.

(57) ABSTRACT

A frame relay protocol-based earth station interface architecture provides full mesh connectivity for a relatively small number of network stations. The fundamental component of the architecture is a frame relay protocol-based switch, which employs a network interface 'frame relay' standard to define the multiplexing of multiple virtual ports across single physical communications port. Through address and control fields of its connectivity control software, the frame relay protocol-based switch can be dynamically configured to provide multilayer addressing and device selectivity, thereby enabling point-to-point connectivity of multiple terminal devices, such as a plurality of audio circuits, to be effected via a single port. Dial codes on the station side of an audio signal multiplexer link are translated into frame relay addresses (data link connection identifiers) that are added to each frame of data for routing through the network. With this additional layer of routing information, audio (voice) connectivity is now available between any two audio circuits (e.g. trunks) in the network.

4 Claims, 4 Drawing Sheets

U.S. PATENT DOCUMENTS

| | | |
|---|---|---|
| 3,643,034 A | 2/1972 | Burns et al. |
| 3,662,110 A | 5/1972 | Van Fossen et al. |
| 3,683,116 A | 8/1972 | Dill |
| 3,701,849 A | 10/1972 | Stapleton |
| 4,018,993 A | 4/1977 | Edstrom |
| 4,135,156 A | 1/1979 | Sanders et al. |
| 4,181,886 A | 1/1980 | Cooperman |
| 4,225,884 A | 9/1980 | Block et al. |
| 4,285,064 A | 8/1981 | Hodge |
| 4,301,533 A | 11/1981 | Acampora et al. |
| 4,307,461 A | 12/1981 | Brickman et al. |
| 4,319,353 A | 3/1982 | Alvarez, III et al. |
| 4,320,504 A | 3/1982 | Alvarez, III et al. |
| 4,328,543 A | 5/1982 | Brickman et al. |
| 4,330,857 A | 5/1982 | Alvarez, III et al. |
| 4,332,026 A | 5/1982 | Alvarez, III et al. |
| 4,346,470 A | 8/1982 | Alvarez, III et al. |
| 4,377,793 A | 3/1983 | Horna |
| 4,381,562 A | 4/1983 | Acampora |
| 4,468,727 A | 8/1984 | Carrison et al. |
| 4,485,478 A | 11/1984 | Takada |
| 4,507,781 A | 3/1985 | Alvarez et al. |
| 4,516,156 A | 5/1985 | Fabris et al. |
| 4,521,879 A | 6/1985 | Gueldenpfennig et al. |
| 4,536,874 A | 8/1985 | Stoffel et al. |
| 4,538,073 A | 8/1985 | Freige et al. |
| 4,587,651 A | 5/1986 | Nelson et al. |
| 4,597,077 A | 6/1986 | Nelson et al. |
| 4,599,647 A | 7/1986 | George et al. |
| 4,616,108 A * | 10/1986 | Yamaguchi et al. ........ 455/12.1 |
| 4,636,879 A | 1/1987 | Narita et al. |
| 4,642,806 A | 2/1987 | Hewitt et al. |
| 4,644,534 A | 2/1987 | Sperlich |
| 4,663,743 A | 5/1987 | Rampuria et al. |
| 4,665,516 A | 5/1987 | Middleton et al. |
| 4,672,602 A | 6/1987 | Hargrave et al. |
| 4,679,191 A | 7/1987 | Nelson et al. |
| 4,680,688 A | 7/1987 | Inou et al. |
| 4,686,698 A | 8/1987 | Tompkins et al. |
| 4,701,907 A | 10/1987 | Collins |
| 4,703,479 A | 10/1987 | Ikeda |
| 4,706,080 A | 11/1987 | Sincoskie |
| 4,706,081 A | 11/1987 | Hart et al. |
| 4,710,917 A | 12/1987 | Tompkins et al. |
| 4,713,806 A | 12/1987 | Oberlander et al. |
| 4,720,850 A | 1/1988 | Oberlander et al. |
| 4,720,873 A | 1/1988 | Goodman et al. |
| 4,730,305 A | 3/1988 | Acampora et al. |
| 4,736,422 A | 4/1988 | Mason |
| 4,739,510 A | 4/1988 | Jeffers et al. |
| 4,747,160 A | 5/1988 | Bossard |
| 4,750,036 A | 6/1988 | Martinez |
| 4,751,732 A | 6/1988 | Kamitake |
| 4,769,833 A | 9/1988 | Farleigh et al. |
| 4,775,974 A | 10/1988 | Kobayashi |
| 4,777,657 A | 10/1988 | Gillaspie |
| 4,792,948 A | 12/1988 | Hangen et al. |
| 4,797,589 A | 1/1989 | Collins |
| 4,797,878 A | 1/1989 | Armstrong |
| 4,797,919 A | 1/1989 | Murray et al. |
| 4,811,338 A | 3/1989 | Haruyama et al. |
| 4,813,039 A | 3/1989 | Yoshihiro |
| 4,829,569 A | 5/1989 | Seth-Smith et al. |
| 4,847,829 A | 7/1989 | Tompkins et al. |
| 4,847,892 A | 7/1989 | Shelley |
| 4,858,225 A | 8/1989 | DeSantis |
| 4,868,811 A | 9/1989 | Suzuki |
| 4,876,737 A | 10/1989 | Woodworth et al. |
| 4,879,711 A | 11/1989 | Rosen |
| 4,888,769 A | 12/1989 | Deal |
| 4,890,280 A | 12/1989 | Hirata |
| 4,894,822 A | 1/1990 | Buhrke et al. |
| RE33,189 E | 3/1990 | Lee et al. |
| 4,916,691 A | 4/1990 | Goodman |
| 4,916,737 A | 4/1990 | Chomet et al. |
| 4,918,653 A | 4/1990 | Johri et al. |
| 4,928,274 A * | 5/1990 | Gilhousen et al. .......... 370/326 |
| 4,933,936 A | 6/1990 | Rasmussen et al. |
| 4,937,825 A | 6/1990 | Ballard et al. |
| 4,937,866 A | 6/1990 | Crowther et al. |
| 4,939,369 A | 7/1990 | Elabd |
| 4,959,784 A | 9/1990 | Kwapisz |
| 4,959,872 A | 9/1990 | Imai et al. |
| 4,965,851 A * | 10/1990 | Tejima ...................... 455/505 |
| RE33,426 E | 11/1990 | Sugimoto et al. |
| 4,970,721 A | 11/1990 | Aczel et al. |
| 4,993,015 A | 2/1991 | Fite, Jr. |
| 4,999,829 A | 3/1991 | Fite, Jr. et al. |
| 5,014,267 A | 5/1991 | Tompkins et al. |
| 5,016,243 A | 5/1991 | Fite, Jr. |
| 5,018,133 A | 5/1991 | Tsukakoshi et al. |
| 5,019,910 A | 5/1991 | Filmer |
| 5,023,869 A | 6/1991 | Grover et al. |
| 5,023,873 A | 6/1991 | Stevenson et al. |
| 5,027,400 A | 6/1991 | Baji et al. |
| 5,029,163 A | 7/1991 | Chao et al. |
| 5,029,207 A | 7/1991 | Gammie |
| 5,038,265 A | 8/1991 | Paladel |
| 5,058,138 A | 10/1991 | Figura et al. |
| 5,065,397 A | 11/1991 | Shiobara |
| 5,077,834 A | 12/1991 | Andros et al. |
| 5,079,764 A | 1/1992 | Orita et al. |
| 5,081,558 A | 1/1992 | Mahler |
| 5,081,621 A | 1/1992 | Sugimoto |
| 5,086,426 A | 2/1992 | Tsukakoshi et al. |
| 5,090,011 A | 2/1992 | Fukuta et al. |
| 5,095,480 A | 3/1992 | Fenner |
| 5,101,267 A | 3/1992 | Morales-Garza |
| 5,111,504 A | 5/1992 | Esserman et al. |
| 5,115,433 A | 5/1992 | Baran et al. |
| 5,121,396 A | 6/1992 | Irvin et al. |
| 5,130,978 A | 7/1992 | Mobasser |
| 5,131,010 A | 7/1992 | Derrenge et al. |
| 5,153,876 A | 10/1992 | Sin |
| 5,177,604 A | 1/1993 | Martinez |
| 5,177,788 A | 1/1993 | Schanning et al. |
| 5,184,347 A | 2/1993 | Farwell et al. |
| 5,191,582 A | 3/1993 | Upp |
| 5,195,090 A | 3/1993 | Bolliger et al. |
| 5,195,091 A | 3/1993 | Farwell et al. |
| 5,208,811 A | 5/1993 | Kashio et al. |
| 5,223,923 A | 6/1993 | Morales-Garza |
| 5,224,099 A | 6/1993 | Corbalis et al. |
| 5,229,990 A | 7/1993 | Teraslinna |
| 5,229,994 A | 7/1993 | Balzano et al. |
| 5,237,564 A | 8/1993 | Lespagnol et al. |
| 5,237,610 A | 8/1993 | Gammie et al. |
| 5,239,545 A | 8/1993 | Buchholz |
| 5,251,207 A | 10/1993 | Abensour et al. |
| 5,260,936 A | 11/1993 | Bardet et al. |
| 5,274,643 A | 12/1993 | Fisk |
| 5,276,907 A | 1/1994 | Meidan |
| 5,278,892 A | 1/1994 | Bolliger et al. |
| 5,280,481 A | 1/1994 | Chang et al. |
| 5,280,625 A * | 1/1994 | Howarter et al. ........... 709/218 |
| 5,287,535 A | 2/1994 | Sakagawa et al. |
| 5,291,479 A | 3/1994 | Vaziri et al. |
| 5,291,492 A | 3/1994 | Andrews et al. |
| 5,295,133 A | 3/1994 | Jurkevich |
| 5,295,137 A | 3/1994 | Jurkevich |
| 5,301,273 A | 4/1994 | Konishi |
| 5,301,358 A | 4/1994 | Gaskill et al. |
| 5,303,042 A | 4/1994 | Lewis et al. |
| 5,303,237 A | 4/1994 | Bergman et al. |

| | | |
|---|---|---|
| 5,305,308 A | 4/1994 | English et al. |
| 5,305,385 A | 4/1994 | Schanning et al. |
| 5,307,348 A | 4/1994 | Buchholz et al. |
| 5,309,440 A | 5/1994 | Nakamura et al. |
| 5,313,454 A | 5/1994 | Bustini et al. |
| 5,313,457 A | 5/1994 | Hostetter et al. |
| 5,315,591 A | 5/1994 | Brent et al. |
| 5,319,705 A | 6/1994 | Halter et al. |
| 5,319,707 A | 6/1994 | Wasilewski et al. |
| 5,319,712 A | 6/1994 | Finkelstein et al. |
| 5,321,514 A | 6/1994 | Martinez |
| 5,325,421 A | 6/1994 | Hou et al. |
| 5,327,421 A | 7/1994 | Hiller et al. |
| 5,331,631 A | 7/1994 | Teraslinna |
| 5,335,276 A | 8/1994 | Thompson et al. |
| 5,337,044 A | 8/1994 | Folger et al. |
| 5,343,465 A | 8/1994 | Khalil |
| 5,345,445 A | 9/1994 | Hiller et al. |
| 5,345,446 A | 9/1994 | Hiller et al. |
| 5,347,304 A | 9/1994 | Moura et al. |
| 5,351,146 A | 9/1994 | Chan et al. |
| 5,353,336 A | 10/1994 | Hou et al. |
| 5,355,362 A | 10/1994 | Gorshe et al. |
| 5,359,367 A | 10/1994 | Stockill |
| 5,361,259 A | 11/1994 | Hunt et al. |
| 5,363,369 A | 11/1994 | Hemmady et al. |
| 5,365,265 A | 11/1994 | Shibata et al. |
| 5,365,524 A | 11/1994 | Hiller et al. |
| 5,373,550 A | 12/1994 | Campbell et al. |
| 5,381,408 A | 1/1995 | Brent et al. |
| 5,387,941 A | 2/1995 | Montgomery et al. |
| 5,387,994 A | 2/1995 | McCormack et al. |
| 5,390,169 A | 2/1995 | Bernstein |
| 5,390,175 A | 2/1995 | Hiller et al. |
| 5,392,277 A | 2/1995 | Bernstein |
| 5,392,402 A | 2/1995 | Robrock, II |
| 5,394,469 A | 2/1995 | Nagel et al. |
| 5,394,561 A | 2/1995 | Freeburg |
| 5,400,329 A | 3/1995 | Tokura et al. |
| 5,400,401 A | 3/1995 | Wasilewski et al. |
| 5,402,418 A | 3/1995 | Shibata et al. |
| 5,402,478 A | 3/1995 | Hluchyj et al. |
| 5,404,505 A | 4/1995 | Levinson |
| 5,408,237 A | 4/1995 | Patterson et al. |
| 5,408,464 A | 4/1995 | Jurkevich |
| 5,412,647 A | 5/1995 | Giroux et al. |
| 5,412,660 A | 5/1995 | Chen et al. |
| 5,416,770 A | 5/1995 | Stoner et al. |
| 5,420,857 A | 5/1995 | Jurkevich |
| 5,420,866 A | 5/1995 | Wasilewski |
| 5,422,882 A | 6/1995 | Hiller et al. |
| 5,423,002 A | 6/1995 | Hart |
| 5,425,027 A | 6/1995 | Baran |
| 5,425,029 A | 6/1995 | Hluchyj et al. |
| 5,426,635 A | 6/1995 | Mitra et al. |
| 5,426,636 A | 6/1995 | Hiller et al. |
| 5,426,640 A | 6/1995 | Hluchyj et al. |
| 5,426,773 A | 6/1995 | Chabanet et al. |
| 5,428,607 A | 6/1995 | Hiller et al. |
| 5,428,608 A | 6/1995 | Freeman et al. |
| 5,428,616 A | 6/1995 | Field et al. |
| 5,428,629 A | 6/1995 | Gutman et al. |
| 5,430,848 A | 7/1995 | Waggener |
| 5,434,850 A | 7/1995 | Fielding et al. |
| 5,434,856 A | 7/1995 | Huang |
| 5,436,891 A | 7/1995 | Grossman et al. |
| 5,438,565 A | 8/1995 | Hemmady et al. |
| 5,446,726 A | 8/1995 | Rostoker et al. |
| 5,446,730 A | 8/1995 | Lee et al. |
| 5,448,564 A | 9/1995 | Thor |
| 5,450,394 A | 9/1995 | Gruber et al. |
| 5,450,395 A | 9/1995 | Hostetter et al. |
| 5,452,293 A | 9/1995 | Wilkinson et al. |
| 5,457,780 A | 10/1995 | Shaw et al. |
| 5,457,808 A | 10/1995 | Osawa et al. |
| 5,457,811 A | 10/1995 | Lemson |
| 5,463,777 A | 10/1995 | Bialkowski et al. |
| 5,465,213 A | 11/1995 | Ross |
| 5,469,468 A | 11/1995 | Schilling |
| 5,469,495 A | 11/1995 | Beveridge |
| 5,471,473 A | 11/1995 | Tejima |
| 5,473,602 A | 12/1995 | McKenna et al. |
| 5,473,612 A | 12/1995 | Dehner et al. |
| 5,481,561 A | 1/1996 | Fang |
| 5,481,609 A | 1/1996 | Cohen et al. |
| 5,483,595 A | 1/1996 | Owen |
| 5,490,252 A | 2/1996 | Macera et al. |
| 5,491,695 A | 2/1996 | Meagher et al. |
| 5,495,607 A | 2/1996 | Pisello et al. |
| 5,497,420 A | 3/1996 | Garneau et al. |
| 5,504,814 A | 4/1996 | Miyahara |
| 5,506,904 A | 4/1996 | Sheldrick et al. |
| 5,517,502 A | 5/1996 | Bestler et al. |
| 5,519,699 A | 5/1996 | Ohsawa |
| 5,526,404 A | 6/1996 | Wiedeman et al. |
| 5,526,489 A | 6/1996 | Nilakantan et al. |
| 5,530,916 A * | 6/1996 | Schultz ...................... 455/518 |
| 5,532,914 A | 7/1996 | Kageyama et al. |
| 5,539,884 A | 7/1996 | Robrock et al. |
| 5,563,876 A * | 10/1996 | Duxbury et al. ............ 370/402 |
| 5,564,076 A | 10/1996 | Auvray |
| 5,565,910 A | 10/1996 | Rowse et al. |
| 5,566,173 A | 10/1996 | Steinbrecher |
| 5,566,229 A | 10/1996 | Hou et al. |
| 5,568,554 A | 10/1996 | Eastlake, III |
| 5,572,530 A * | 11/1996 | Chitre et al. ................ 370/524 |
| 5,579,370 A | 11/1996 | Fukushima et al. |
| 5,587,743 A | 12/1996 | Montgomery et al. |
| 5,592,173 A | 1/1997 | Lau et al. |
| 5,594,782 A | 1/1997 | Zicker et al. |
| 5,600,844 A | 2/1997 | Shaw et al. |
| 5,608,722 A * | 3/1997 | Miller ....................... 370/320 |
| 5,628,011 A | 5/1997 | Ahamed et al. |
| 5,652,795 A | 7/1997 | Dillon |
| 5,689,553 A | 11/1997 | Ahuja et al. |
| 5,699,384 A | 12/1997 | Dillon |
| 5,727,065 A | 3/1998 | Dillon |
| 5,796,727 A | 8/1998 | Harrison et al. |
| 5,805,573 A * | 9/1998 | Umeda ....................... 370/321 |
| 5,812,545 A * | 9/1998 | Liebowitz et al. .......... 370/337 |
| 5,841,765 A * | 11/1998 | Fielding et al. ............. 370/319 |
| 5,852,721 A | 12/1998 | Dillon et al. |
| 5,912,883 A * | 6/1999 | Hershberg .................. 370/319 |
| 6,097,706 A * | 8/2000 | Fielding et al. ............. 370/319 |

FOREIGN PATENT DOCUMENTS

EP            0 535 890         9/1992

OTHER PUBLICATIONS

Newton, Harry, Newton's Telecom Dictionary, 9th Edition, Flatiron Publishing, Inc., p. 709, Sep. 1995.
Stan Prentiss, "Satellite Communications", Tab Books Inc., pp. 23-29, 1983.
Platt and M.J. Morse, "Some Aspects of Traffic Management in Frame Relay Networks," UK Teletraffic Symposium, 1991 8th IEE, pp. 23/1 to 23/6, 1991.
Nick Cooper, "Network Technology for Multimedia," IEE Colloq. (1992) No. 160: Interactive Mutimedia: A Review and Update, pp. 6/1 to 6/3, 1992.
"Communication, Television & Broadcast Satellite Systems, Theory & Technology", Hans Dodel et al., 2.sup.nd , revised edition, .COPYRGT.1990 Huthig Verlag GmbH, Heidelberg, Telecommunications, vol. 7.

"VSAT Systems Considerations for the ORION Satellite" by Steven B. Salamoff and Denis J. Curin, Ph.D., of Orion Satellite Corporation, Sep. 1992.

"Satellite Communications Systems" from Understanding Communiation Systems, 1984, pp. 243-270.

"Fiber Optic and Satellite Communications" from Understanding Data Communications, 1993, pp. 202-207.

"Multiplexing Techniques" from Understanding Data Communications, 1993, pp. 161-178.

"Frame Relay and Its Transportation Dilemma" by Asim K.Roy, pp. 393-400, Sep. 1991.

"Some Aspects of Traffic Management in Frame Relay Networks" by A. Platt and M.J. Morse, presented at the Institution of electrical Engineers, Eigth U k Teletraffic Symposium, Apr. 10-12, 1991, pp. 23/1-23/6.

"9800 Frame Relay Commands Reference Manual", Teleglobe Communication Products, Jun. 1993.

"Model 710 communications Subsystem", Harris Corporation, Business communication Systems Division, Melbourne, Florida, Dec. 1986, Sections 1-6.

"SCPC: Satellite Links with Infinite Uses", Feb. 1993, Telecom Asia, pp. CLO2148-CLO2149.

"VSAT-Enhanced ISDN: Architectures and Implementation" by Abdul H. Rana, et al, IEEE Journal on Selected Areas in Communications, Aug. 10, 1992.

"Model 712 Communications Subsystem", Harris Corporation, Business Communication Systems Division, Melbourne, Florida, May 1987, Sections 1-4.

"Principles of Communications Satellites" by Gordon and Morgan, pp. 114-135, 1993.

"Communications—Fusing Command, Control and Intelligence", Conference Record, vol. 2 of 3, San Diego, California, Oct. 11-14, 1992.

"The Management Aspects of Frame Relay" by Nathan J. Muller, International Journal of Network Management, pp. 87-99, Jun. 1992.

"Fiber Optic and Satellite Communications", by George E. Friend, et al, Understanding Data Communications, pp. 145-166; Jun., 1988.

"What Users Can Expect From New Virtual Wideband Services" by Stephen Fleming, Oct., 1990, pp. 29-36.

Brochure entitled "The SDM-HDLC Voice Packetizer Transmits Voice Over A Packet Network", 2 pages, by Advanced Compression Technology, Inc., 685 East Cochran Street, Simi Valley, CA 93065-1939, Jan. 20, 1993.

"Bringing the Telephone to Mexico—Satellites work in a Rural Environment" by Andres Liana, Jr., Jan., 1992, pp. 52-54.

"Reasonable Connectivity Through Multimedia Networking System", Sep. 1992, pp. 30-32.

Brochure entitled "MS-1000/MS-2000 Multimedia Switches" by Multimedia Networking Systems, pp. CLO4715-CLO4722, Jan. 20, 1993.

"ISDN over Satellite Networks", by B.A. Pontano et al, COMSAT Laboratories, Clarksburg, MD 20871-9475, 1992, IEEE, pp. 0560-0564.

"Wellfleet Unveils Two Bridge-Router Aimed at Branch Networking"by Andrew Collier, Internetworking—Comm. Week Apr. 19, 1993, single sheet.

Specification including General TDM Overview, Skydata, Sections 1-4, Annex III, Apr. 28, 1992.

Presentation, Cemex, May 1992.

FAX, Regarding TDM/TDMA System, Cemex, Apr. 27, 1992.

Polycon VSAT Proposal, Skydata, Sections 1-5, Annexes III-IV, XX, Mar. 18, 1992.

Newton's Telecom Dictionary, 8$^{th}$ Edition, 1994, Flatiron Publishing, p. 901, Satellite Link.

* cited by examiner

FIG. 4
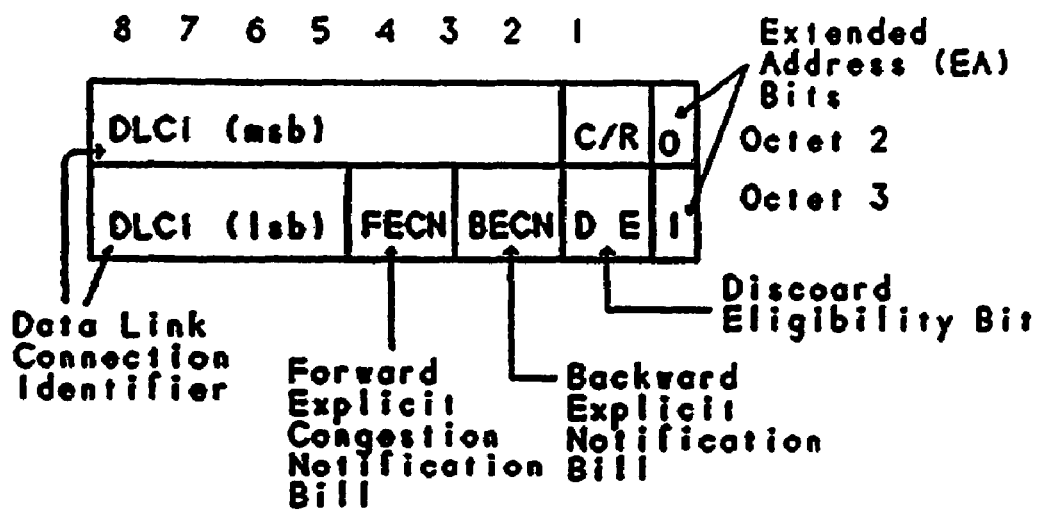
Address Field Format
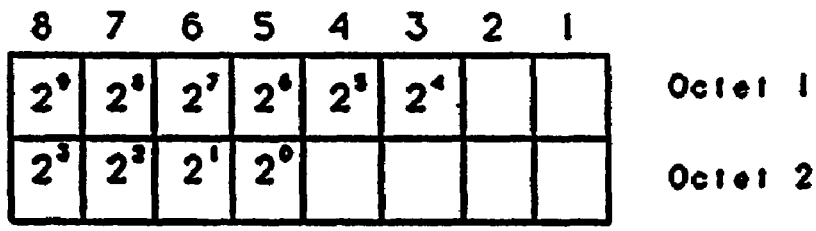
Bit mapping for DLCI
FIG. 5
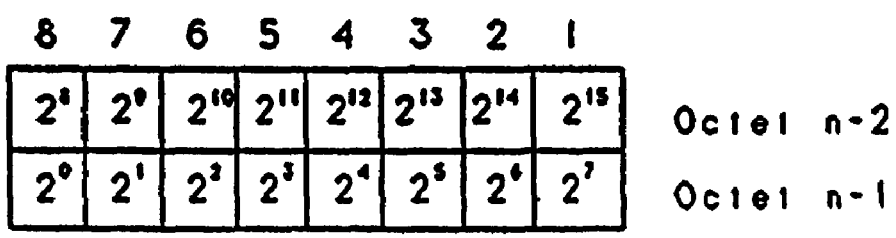
Bit mapping for FCS
FIG. 6

FRAME RELAY PROTOCOL-BASED MULTIPLEX SWITCHING SCHEME FOR SATELLITE MESH NETWORK

This application is a continuation of application Ser. No. 10/437,536, filed May 14, 2003, now U.S. Pat. No. 6,771,617, which is a continuation of application Ser. No. 10/071,307, filed Feb. 8, 2002, now U.S. Pat. No. 6,625,130, which is a continuation of application Ser. No. 08/786,234, filed Jan. 21, 1997, now U.S. Pat. No. 6,381,227 which is a continuation of application Ser. No. 08/499,766, filed Jul. 7, 1995, now abandoned which is a continuation of application Ser. No. 08/079,250, filed Jun. 17, 1993, now U.S. Pat. No. 5,434,850. The entire disclosures of all of the parent applications are hereby incorporated by reference.

FIELD OF THE INVENTION

The present invention relates in general to satellite communication systems, and is particularly directed to a frame relay protocol-based earth station interface for providing full mesh, bidirectional signalling capability between a plurality of (diverse bandwidth) end terminal devices, including multiple audio (voice) circuits, for any of the stations of the network.

BACKGROUND OF THE INVENTION

The increasing availability of reasonably priced satellite communication services, and a variety of narrow bandwidth (voice/data) and wide bandwidth (video) devices to meet the needs of a broad spectrum of communication system users, has led to communication system architectures that can be tailored in terms of connectivity structure and customer utilization. This diversity of equipment types and signal processing capability has led to the desire to have 'local' area networks (LANs), customarily limited to a terrestrial-based systems, typically limited to geographical area, be expanded to encompass a much larger scale of communication services, preferably those employing satellite link transmission equipment to connect terminal devices among well dispersed office sites.

To facilitate inter-office communications, it is preferred to have such satellite-based systems configured as full mesh networks, diagrammatically illustrated in FIG. 1 where any terminal device 10 in the network (comprised of a non-limitative example of four earth stations 11, 12, 13, 14 in the illustrated example) has a direct satellite link 20 (via one hop through a relay satellite 30) to any other terminal device 10 in the network. Connectivity between a respective terminal device 10 that is ported to an associated station interface and a respective terminal device ported to another station interface may be effected by providing each earth station with a multiplexing, demultiplexing subsystem, that is operative to controllably uplink messages from any terminal device (e.g. audio (voice), data, video equipment) over an outbound link and to distribute downlink messages to their intended destination terminal devices.

One type of multiplexing scheme that might be used could involve a time division multiplexing (TDM) and demultiplexing arrangement through which a fixed number of bytes for each user port would be allocated within a fixed information frame. The frame size (total number of bytes) may be determined by the number of ports and their data rates, and the number of frames transmitted per second. The number of TDM frames per second determines the aggregate data rate. The aggregate data rate includes the total user port data rate plus framing overhead.

Interfacing respective terminal devices with the TDM subsystem may be effected by means of a dedicated multiport switch associated with the respective multiplexer and demultiplexer units of the earth station, with each multiport switch being configured for an equal number of data communications equipment (DCE) and data terminal equipment (DTE) ports, so as to provide full matrix capability between DCE and DTE ports. The port speed and format (DCE to DTE) must match; however, matrix switches can usually translate between different physical and electrical characteristics.

A problem associated with such a TDM-matrix switch earth station architecture proposal is the fact that its terminal-to-terminal connectivity involves dedicated port connections, which remain fixed unless the system is physically reconfigured. As a result, in such as system, only a very limited selectivity for voice calls is afforded, since only point-to-point connections can be effected between voice multiplexers and not among the voice circuits themselves that connect to the voice multiplexers. In addition, TDM schemes are very sensitive to timing and network synchronization, since no queuing is performed. A master network timing source is required for all network subsystems. Also, because suppliers of multiplexer and matrix switch components are not the same, different monitor and control mechanisms are required for each respective piece of equipment. This requirement is further burdened by the fact that, due to the unique character of a simplex data stream, the required multiplexer/demultiplexer is not an off-the-shelf product. Finally, the cost of such a system is not insubstantial, since each of the multiport switch and the multiplexer and demultiplexer components must be purchased separately.

SUMMARY OF THE INVENTION

In accordance with the present invention, the desire to provide full mesh connectivity for a relatively small number of network stations (e.g. on the order of sixteen or less, as a non-limitative example) is successfully addressed by a frame relay protocol-based earth station interface architecture. The fundamental component of this architecture is a frame relay protocol-based switch, or simply frame relay switch, which comprises a multiplex communication component recently introduced for use in voice/facsimile communication multiplex applications, and which employs a network interface 'frame relay' standard to define the multiplexing of multiple virtual ports across single physical communications port. The interface standard 'frame relay' is based upon the transmission and reception of individual frames or packets of information serially through a port, with a respective frame of digital data containing additional address and control bytes for routing and elementary error detection and flow control.

In the novel earth station environment of the present invention, the frame relay switch is ported, via a first set of terminal ports, to a plurality of 'local' terminal devices, which may include respective voice, data and video signalling equipments. A voice signal link transports low bit rate digitized voice signals, such as those having an encoding rate of less than 10 kb/s, to and from a voice signal multiplexer, in order to interface voice traffic with a plurality of voice signalling circuits that are selectively accessible through the multiplexer. The voice signalling link also conveys call supervision signals, including dial tone detection, dialing, circuit busy, call connect and call termination control and status signals. The voice signal multiplexer is operative to append and decode terminal device selectivity information to the address field portion of a frame processed by the frame relay switch.

Also ported to the frame relay switch are one or more data links that may be coupled to two-way synchronous data terminal devices, providing data rate signalling on the order of 256 Kb/s, for example. An additional port of the frame relay switch may be coupled to a link for wide bandwidth signals, such as a video teleconferencing terminal. The teleconferencing video and its associated voice signals may be digitized and compressed into a single data stream at aggregate data rates on the order of from 112 to 384 kb/s, for example. Because of the wider bandwidth required for video teleconferencing capability, the video communication port of the frame relay switch is intended to be used on only an occasional basis, and may require one or more other signalling channels to be turned off during the teleconferencing period.

Through address and control fields employed by frame relay connectivity control software, the frame relay switch can be dynamically configured to provide multilayer addressing and device selectivity (filtering), thereby enabling point-to-point connectivity of multiple terminal devices, such as a plurality of voice circuits served by the voice circuit multiplexer unit to which a voice signal port of the frame relay switch is coupled. Dial codes on the trunk or station side of the voice signal link are translated into frame relay addresses (data link connection identifiers) that are added to each frame of data for routing through the network. With this additional layer of routing information, voice connectivity is now available between any two voice terminal devices (e.g. trunks) in the network.

On its satellite link side, the frame relay switch is ported to a plurality of modulator and demodulator circuits contained within a modulator/demodulator unit. To provide full mesh connectivity among the multiple earth station network, the circuits of the modulator/demodulator unit include a single uplink modulator and a plurality of downlink demodulators. The respective modulator and demodulator components may comprise PSK signalling units employing, for example, (data rate dependent) BPSK/QPSK/MSK modulation. The modem unit is coupled to an attendant RF transceiver unit that is coupled to an associated satellite antenna unit for transmitting uplink channel signals to the relay satellite and receiving downlink channel signals from the satellite.

In order to optimize traffic flow among the diversity of terminal devices (voice, data, video) served by the frame relay-based interface of the present invention, the routing control mechanism employed by the frame switch relay's microcontroller includes priority queuing, which provides a plurality of queuing levels to control queuing delay through the frame relay switch. Voice frames are given highest priority, video teleconferencing frames are given the next highest priority, and data frames are given lowest priority. The queuing mechanism is defined such that during normal operation, the frame relay switch will not have more offered traffic than the aggregate outbound channel can handle. Priority queuing has effectively no impact on the sequence of transmitted frames. Where the offered load increases or the channel error rate exceeds prescribed limits, the priority queuing mechanism is operative to reduce the load impact on video teleconferencing first and then voice signalling traffic.

Since, in a full connectivity mesh network, each earth station is continuously monitoring each downlink channel for message frames that may be addressed to it, it is desirable to provide a mechanism for reducing signal processing housekeeping that would otherwise be executed on data frames that are not intended for a destination terminal device served by that earth station. The port configuration parameters of the frame relay switch define a bit mask, which is employed by the microcontroller to 'filter' and selectively discard or pass frames based upon a portion of or the entirety of the first byte of the frame relay address. This mask feature allows only downlinked frames from multiple inbound channels that are destined for one or more terminal devices served by that earth station to be accepted and processed by the frame relay switch. This preliminary filtering reduces processing load and increases efficiency of the routing through the frame relay switch.

The address and routing mechanism employed by the frame relay switch's microcontroller also inserts, within the frame relay header, a discard eligibility bit, which signifies to the frame relay network whether or not, during periods of congestion, that frame can be initially discarded in an attempt to alleviate the congestion condition. As a result of potential system congestion related to the above described priority queuing and filtering mechanisms, a prespecified data link connection identifier may be employed to 'force' the discard eligibility bit in the frame relay header to a 'one' bit for all frames utilizing that particular data link connection identifier. This forcing of the discard eligibility bit to a 'one' by means of a data link connection identifier provides an extra level of control on frames originating from terminal devices that may be unable to set the discard eligibility bit themselves.

BRIEF DESCRIPTION OF THE DRAWINGS

FIGS. 4, 5 and 6 show details of respective address, data link connection identifier (DLCI) and frame check sequence (FCS) fields of the frame relay format of FIG. 3.

DETAILED DESCRIPTION

Figure 1:
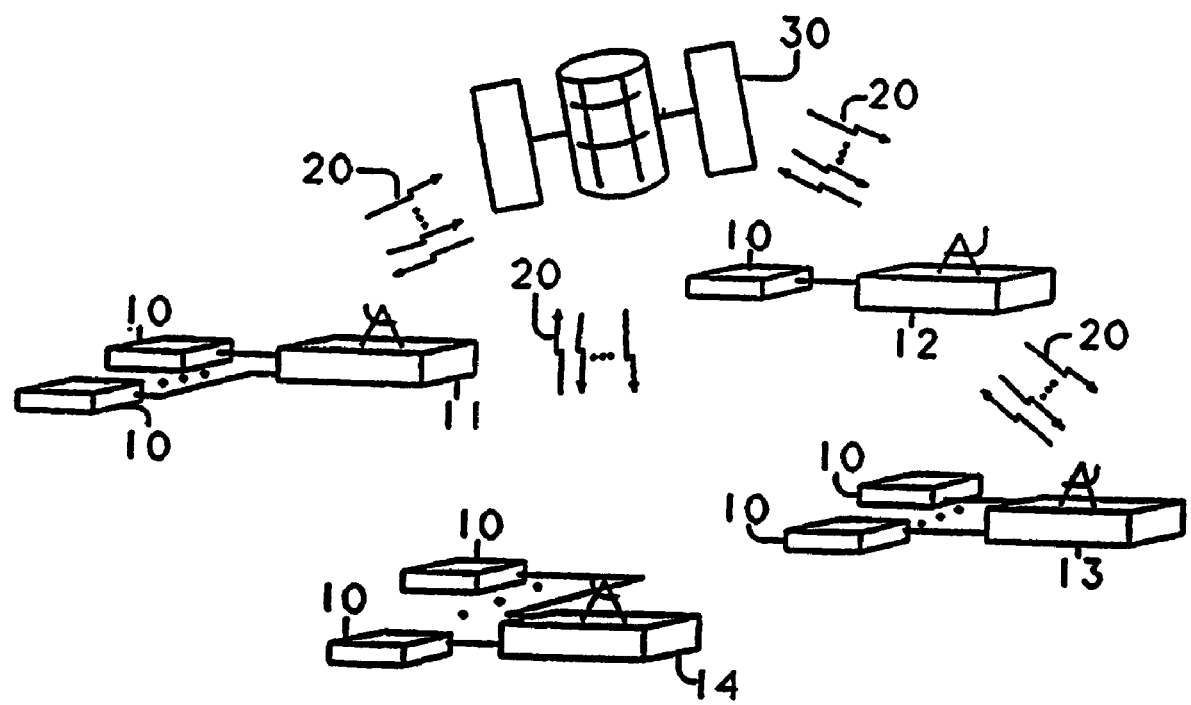
FIG. 1 diagrammatically illustrates a full mesh satellite-based communication network, where any terminal device in the network has a direct satellite link to any other terminal device in the network.

Before describing in detail the particular frame relay protocol-based earth station interface in accordance with the present invention, it should be observed that the present invention resides primarily in a novel structural combination of conventional (commercially available) signal processing circuits and components and not in the particular detailed configurations thereof. Accordingly, the structure, control and arrangement of these circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
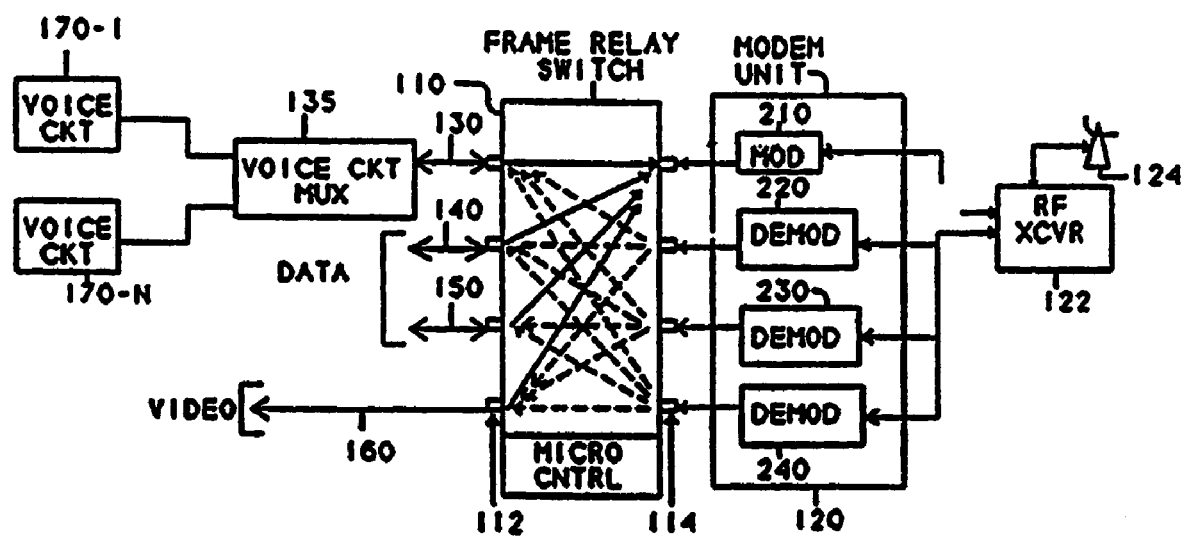
FIG. 2 diagrammatically illustrates the architecture of a frame relay protocol-based earth station interface in accordance with an embodiment of the present invention.

Referring now to FIG. 2, the architecture of a frame relay protocol-based earth station interface in accordance with an embodiment of the present invention is diagrammatically illustrated as comprising a frame relay protocol-based switch (or simply frame relay switch) 110, having a plurality of bidirectional signal coupling ports and serving to controllably interface signal transport links, that are coupled to a plurality of terminal devices, with modulator and demodulator components associated with a satellite communication RF transceiver unit.

More particularly, frame relay switch 110 has a first plurality of physical device, or terminal, ports 112, that are coupled to a plurality of 'local' terminal devices via respective terminal device links, such as a voice signal multiplexer link 130, a plurality of data links 140, 150 and a video link 160. Voice signal link 130 transports low bit rate digitized voice signals, such as those having an encoding rate of less than 10 kb/s, with echo cancellation and minimal queuing delay to and from a voice signal multiplexer 135. Voice signal multiplexer 135, in turn, is coupled to a plurality of voice signalling circuits. The ports of multiplexer 135 which provide connectivity between one of plural voice signalling circuits and voice signal link 130 are, in effect, virtual ports of the frame relay switch 110, since link 130 is physically connected to a single port of multiplexer 135 and not to the terminal devices themselves.

For incoming signals from a respective voice circuit, multiplexer 135 is operative to selectively couple signals sourced from that voice circuit terminal device (e.g. trunk circuit) to voice signal link 130. In the course of multiplexing such a selected voice circuit to voice signal link 130, multiplexer 135 provides data link connection identifier information (the virtual port address) as part of the address field of the call message signals being supplied to the frame relay switch. The destination address field also contains a terminal device (e.g. called party number) code that a voice circuit multiplexer served by a destination station employs to control the demultiplexing of the voice signals to the called terminal device.

Similarly, in the course of demultiplexing an incoming call supplied from frame relay switch 110 via voice signal link 130, multiplexer 135 decodes the data link connection identifier information as part of the address field of the call message signals being supplied from the frame relay switch, so as to controllably direct the call to the intended terminal device. Also carried via link 130 are conventional call supervision signals, including dial tone detection, dialing, circuit busy, call connect and call termination control and status signals.

Data links 140 and 150 may be coupled to two-way synchronous data terminal devices, and may provide data rate signalling on the order of 256 Kb/s. Video link 160 may be coupled to a video teleconferencing terminal. The teleconferencing video and its associated voice signals may be digitized and compressed into a single data stream at aggregate data rates on the order of from 112 to 384 kb/s, for example. Because of the wider bandwidth required for video teleconferencing capability, the video communication port of the frame relay switch is intended to be used on only an occasional basis, and may require one or more other signalling channels to be turned off during the teleconferencing period.

Frame relay switch 110 may comprise a commercially available frame relay switch unit, such as a model 9800, microcontroller-driven, frame relay switch, manufactured by Teleglobe Inc., Montreal, Canada. The frame relay switch employs the network interface 'frame relay' standard (e.g. ANSI, pending CCITT), to define the multiplexing of multiple virtual ports across single physical communications port. The interface standard 'frame relay' is based upon the transmission and reception of individual frames (or packets) of information serially through a port. In accordance with this standard, a respective frame of digital data contains address and control bytes that are employed for routing and elementary error detection and flow control.

Figure 3:
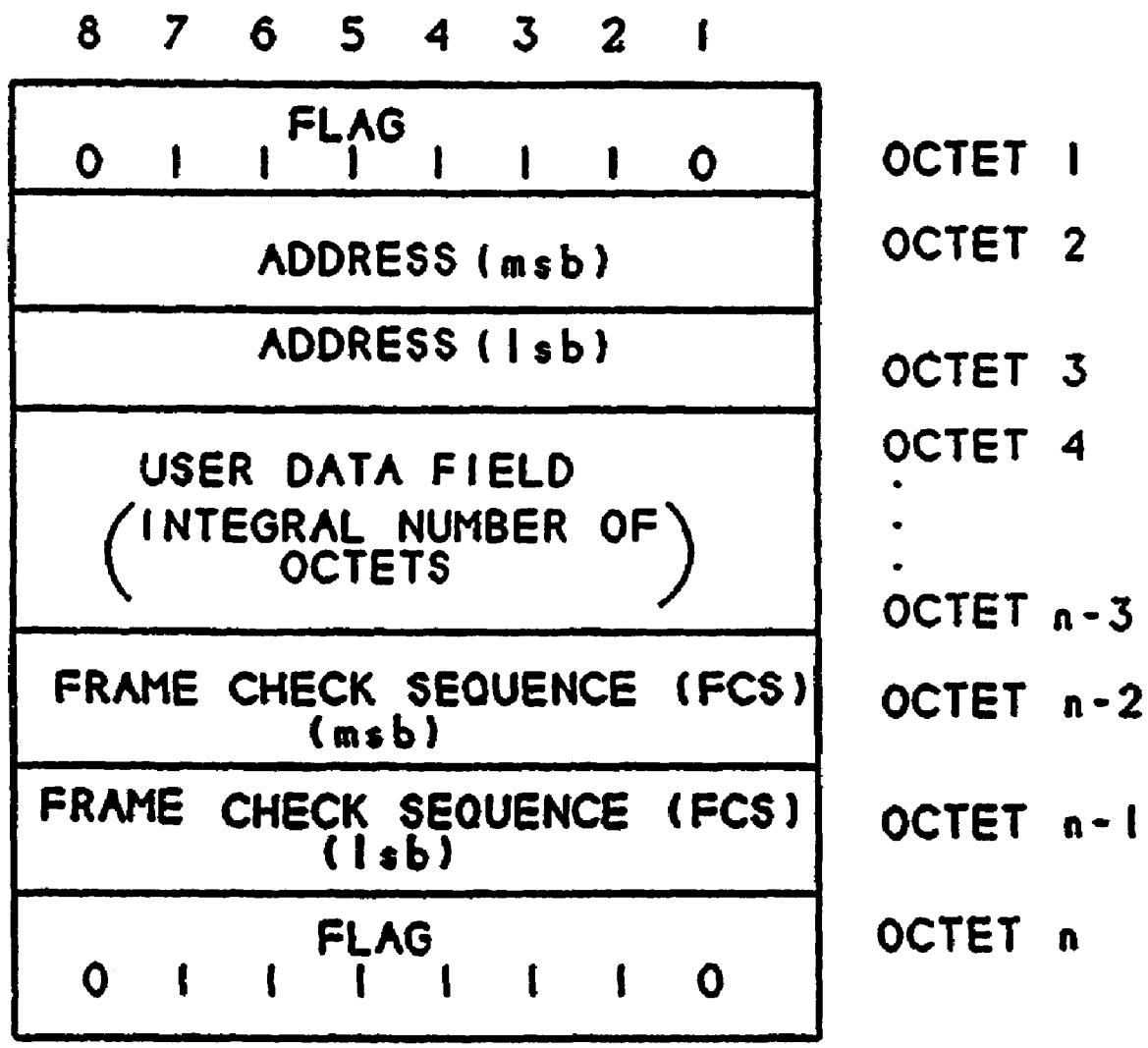
FIG. 3 illustrates the field format of a frame relay frame.

FIG. 3 illustrates the field format of a frame relay frame, as comprising an n octet frame including a first frame boundary flag (octet 1=01111110), a sixteen bit address field comprised of address octets 2 and 3, a user data field comprised of octets 3– n–3, a sixteen bit frame check sequence (FCS) occupying octets n–2 and n–1, and a terminal frame boundary flag (octet n=01111110).

The respective components of the address field of the frame relay frame format of FIG. 2, of which octets 2 and 3 are comprised are diagrammatically illustrated in FIG. 4 as comprising a first data link connection identifier (DLCI) comprised of bits 3–8 of octet 2, a (currently unused) bit 2, an extended address bit 1, a second data link connection identifier (DLCI) comprised of bits 5–8 of octet 3, a forward (towards the destination device) explicit congestion notification bit 4, a backward (from the sourcing device) explicit congestion notification bit 3, a discard eligibility bit 2 (to be described) and an extended address bit 1. The bit mapping for each data link connection identifier (DLCI) is shown in FIG. 5, while FIG. 6 shows the bit mapping for the frame check sequence.

As noted above, through the address and control fields of its connectivity control software, frame relay switch 110 can be dynamically configured to provide multilayer addressing and device selectivity (filtering), thereby enabling point-to-point connectivity of multiple terminal devices, such as a plurality of voice circuits 170-1, . . . 170-N served by voice circuit multiplexer unit 135, to which voice signal multiplexer link 130 is coupled, to be effected via a single port. For this purpose, dial codes on the analog trunk or station side of voice signal multiplexer link 130, which codes effectively represent virtual ports of the frame relay switch, are translated into frame relay addresses (or data link connection identifiers) that are added to each frame of data for routing through the network. With this additional layer of routing information, voice connectivity is now available between any two terminal devices (e.g. trunk circuits) in the network On its satellite link side, frame relay switch 110 is ported, via a second set 114 of terminal ports, to a plurality of modulator and demodulator circuits contained within a modulator/demodulator unit 120. To provide full mesh connectivity among the (four earth station) network of the non-limitative example of FIG. 1, described above, modulator/demodulator (MODEM) unit 120 includes a single uplink modulator 210, and a plurality (three for the present example of a four earth station network) of downlink demodulators 220, 230 and 240. The respective modulator and demodulator components within MODEM unit 120 may comprise PSK signalling units employing, for example, (data rate dependent) BPSK/QPSK/MSK modulation. Thus, frame relay switch 110 provides for dynamic routing of signals between one or more terminal devices to which ports 112 are coupled, and one or more modulators and demodulators of MODEM unit 120 to which ports 114 are coupled.

MODEM unit 120 is coupled to an attendant RF transceiver unit 122 that is coupled with a satellite uplink/downlink antenna unit 124. As a non-limitative example, the respective components of modem unit 120 may interface signals with RF transceiver unit 122 at a frequency on the order of 70 MHz, while the satellite communication signals emitted by and received by RF transceiver unit 122 may fall within bandwidth of 11–14.5 GHz. RF transceiver unit 122 may operate with time division multiple access (TDMA) or single channel per carrier (SCPC) signalling formats.

In order to optimize traffic flow among terminal devices (voice, data, video equipments) served by the frame relay-based interface of the present invention, the routing control mechanism employed by the frame switch relay's microcontroller also includes priority queuing, which provides a plurality (e.g. three for the three types of terminal device signalling services of the present example (voice, data, video)) of queuing levels to control queuing delay through the frame relay switch 110. In particular, voice frames (ported via link 140) are given highest priority, video teleconferencing frames (ported via link 160) are given the next highest priority, and data frames (ported via links 150) are given lowest priority. The queuing mechanism is defined such that during normal operation, the frame relay switch 110 will not have more offered traffic than the aggregate outbound channel can handle. Priority queuing has effectively no impact on the sequence of transmitted frames. Where the offered load increases or the channel error rate exceeds prescribed limits, the priority queuing mechanism is operative to reduce the load impact on video teleconferencing first and then voice signalling traffic.

Since, in a full connectivity mesh network, each earth station is continuously monitoring each downlink channel for message frames that may be addressed to it, it is desirable to provide a mechanism for reducing signal processing housekeeping that would otherwise be executed on data frames that are not intended for a destination terminal device served by that earth station. For this purpose, the port configuration parameters of the frame relay switch may be employed to define a bit mask, which is employed by the microcontroller to 'filter' and selectively discard or pass frames based upon a portion of or the entirety of the first byte of the frame relay address. This mask feature allows only downlinked frames from multiple inbound channels that are destined for one or more terminal devices served by that earth station to be accepted and processed by the frame relay switch. This preliminary filtering reduces processing load and increases efficiency of the routing through the frame relay switch.

The address and routing mechanism employed by the frame relay switch's microcontroller contains, within the frame relay header, the above-referenced discard eligibility (DE) bit (within the second octet of the address field, shown in FIG. 4), which signifies to the frame relay network whether or not, during periods of congestion, that frame can be initially discarded in an attempt to alleviate the congestion condition. Namely, any frame whose discard eligibility bit has been set to a 'one' will be discarded in an attempt to alleviate the congestion condition. As a result of potential system congestion related to the above described priority queuing and filtering mechanisms, a prespecified data link connection identifier may be employed to 'force' the discard eligibility bit in the frame relay header to a 'one' bit for all frames utilizing that particular data link connection identifier. This forcing of the discard eligibility bit to a 'one' by means of a data link connection identifier provides an extra level of control on frames originating from terminal devices that may be unable to set the discard eligibility bit themselves.

As will be appreciated from the foregoing description, the frame relay-based earth station interface architecture in accordance with the present invention provides a mechanism for successfully achieving full mesh connectivity for a relatively small number of network stations. Advantageously, since the fundamental component of the architecture is a frame relay switch, which employs a network interface 'frame relay' standard to define the multiplexing of multiple virtual ports across single physical communications port. As a consequence, through address and control fields of its connectivity control software, the frame relay switch can be dynamically configured to provide multilayer addressing and device selectivity, thereby enabling point-to-point connectivity of multiple terminal devices, such as a plurality of voice circuits, to be effected via a single port. Dial codes on the station side of an audio (voice) signal multiplexer link are translated into frame relay addresses (data link connection identifiers) that are added to each frame of data for routing through the network. With this additional layer of routing information, audio (voice) connectivity is now available between any two audio (voice) circuits (e.g. trunks) in the network.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A first earth station for use in a system having earth stations interconnected via a satellite, the first earth station comprising:
   a satellite antenna,
   a transceiver coupled to the satellite antenna for sending signals to and receiving signals from the satellite antenna,
   a frame relay switch configured to:
      connect a plurality of terminal devices,
      input data from the plurality of terminal devices,
      packetize the data into data packets having an address field, a data field, and control bytes for elementary error detection, and
      route packets, such that the frame relay switch provides point to point connectivity between the plurality of terminal devices.

2. The first earth station of claim 1 wherein the frame relay switch processes video.

3. The first earth station of claim 1 wherein the frame relay switch processes data.

4. The first earth station of claim 1 wherein the frame relay switch processes video teleconferencing data.

* * * * *